United States Patent [19]
Kerscher, III

[11] 3,978,463
[45] Aug. 31, 1976

[54] OSCILLATOR ENERGIZED LIQUID LEVEL INDICATOR

[75] Inventor: William J. Kerscher, III, Flint, Mich.

[73] Assignee: General Motors Corporation, Detroit, Mich.

[22] Filed: Aug. 4, 1975

[21] Appl. No.: 601,598

[52] U.S. Cl. .............................. 340/244 C; 340/59; 331/65
[51] Int. Cl.² ......................................... G08B 21/00
[58] Field of Search ............ 340/244, 59; 73/304 R; 123/41.15; 331/64, 65, 108 C; 307/10 R, 118

[56] References Cited
UNITED STATES PATENTS

| | | | |
|---|---|---|---|
| 2,962,641 | 11/1960 | Maltby et al. | 340/244 C |
| 3,042,908 | 7/1962 | Pearson | 340/244 C |
| 3,614,730 | 10/1971 | Bozoian | 340/59 |
| 3,644,885 | 2/1972 | Radin | 340/59 |
| 3,689,883 | 9/1972 | Hill | 340/59 |
| 3,694,804 | 9/1972 | Hill | 340/59 |
| 3,868,664 | 2/1975 | Hill | 340/244 E |
| 3,889,247 | 6/1975 | Voll | 340/244 C |
| 3,911,373 | 10/1975 | Ohtake et al. | 331/65 |
| 3,916,213 | 10/1975 | Luteran | 307/118 |

FOREIGN PATENTS OR APPLICATIONS

| | | | |
|---|---|---|---|
| 451,239 | 9/1948 | Canada | 340/244 C |

*Primary Examiner*—John W. Caldwell
*Assistant Examiner*—Daniel Myer
*Attorney, Agent, or Firm*—Warren D. Hill

[57] ABSTRACT

An oscillator has its output coupled to a control element of a switch as well as to a probe. When the probe is in contact with liquid in a container, it is essentially grounded so that the switch is turned off. When, however, the liquid level falls below the probe, the oscillator output signal turns on the switch, which in turn illuminates an indicator lamp. A pair of latching circuits are connected from a point between the lamp and the switch to the oscillator and to the switch contact element and serve to bias the switch on and turn the oscillator off once the lamp has been illuminated.

1 Claim, 1 Drawing Figure

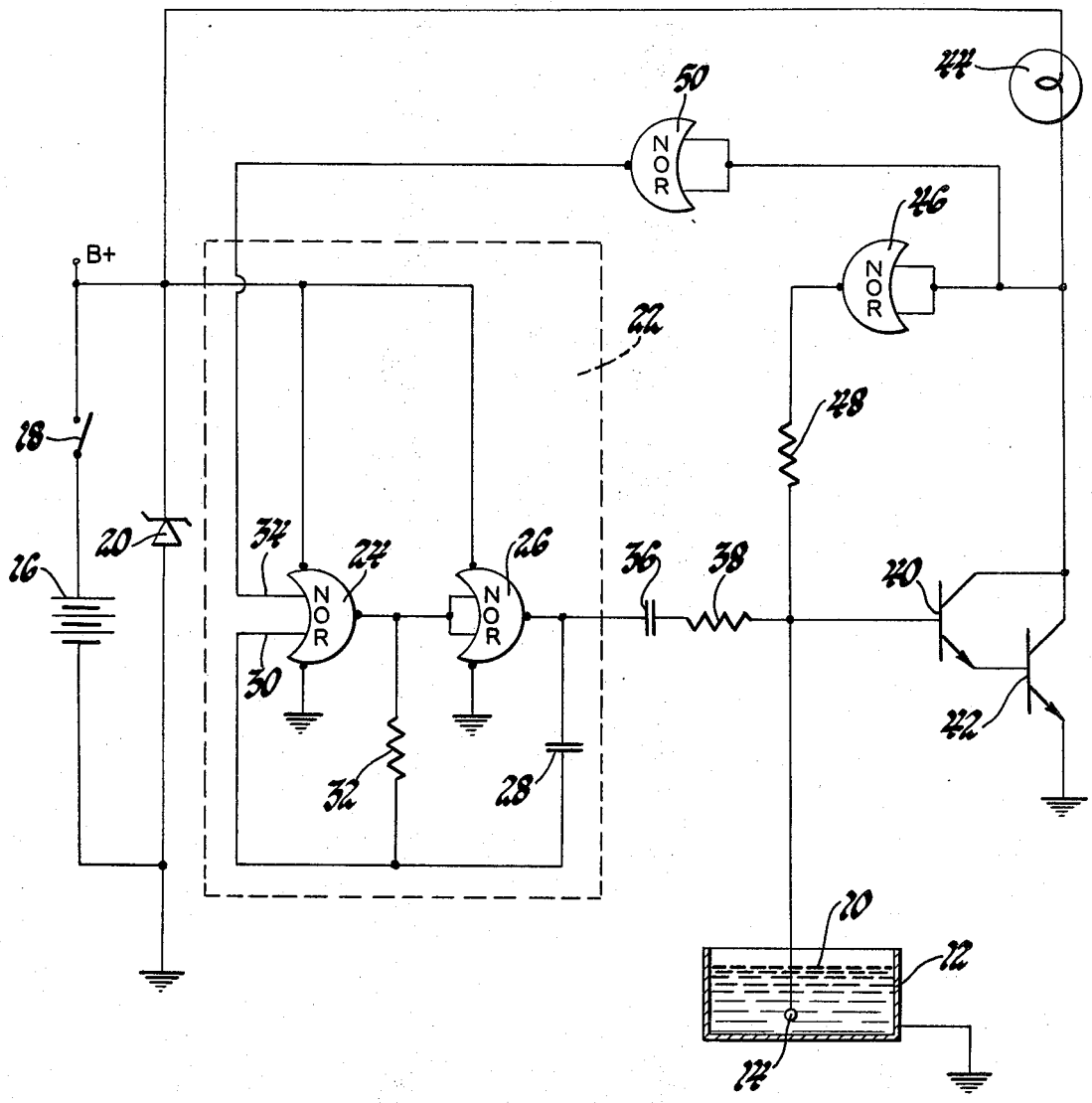

OSCILLATOR ENERGIZED LIQUID LEVEL INDICATOR

This invention relates to a circuit for monitoring the level of liquid in a container. It has previously been known to provide low liquid level warning circuits comprising an oscillator coupled to a transistor switch to control a warning lamp, the switch being turned off when a probe is in contact with the liquid and being turned on when the liquid level recedes to a level below the probe. Generally, such devices produce a flashing of the warning lamp which in some instances is undesirable. It has been attempted to maintain constant illumination of the lamp by adding a rectifier and a capacitor in the lamp circuit, however, this results not only in an added expense in the circuit but also provides a dim light.

It is therefore a general object of this invention to provide a low liquid level warning circuit having a lamp which is brightly and constantly illuminated during the warning mode and which circuit is simple and inexpensive to manufacture.

The invention is carried out by providing an oscillator capacitively coupled to a control element of a switch and also coupled to a probe for contacting a liquid within a container, a warning device in circuit with the switch for actuation thereby, a first latching circuit connected from the switch output to the control element which tends to maintain the switch biased on once it has been turned on and a second latching circuit connected from the switch output to the oscillator for disabling the oscillator.

The above and other advantages will be made more apparent from the following specification taken in conjunction with the accompanying drawing which is a schematic electrical diagram of the liquid level warning circuit according to the invention.

The invention is described herein as applied to an automotive vehicle wherein the level of some liquid such as coolant in a radiator is being monitored. This is depicted as a liquid 10 in a container 12. The container is electrically connected to ground and the liquid 10 is at least a fairly good conductor of electricity. A probe 14 is located in the container 12 at a level corresponding to that liquid level which is being monitored. Thus as long as the liquid is in contact with the probe, the probe is electrically grounded through the liquid and the container where at most a small voltage drop will be present between the probe 14 and ground. When, however, the liquid level drops below the position of the probe 14, the probe is essentially isolated from ground.

A battery or other DC power supply 16 is connected between ground and a terminal B+ through an ignition switch 18. A zener diode 20 across the power supply serves to remove voltage spikes from the automotive circuit. An oscillator 22 connected to the power supply comprises first and second NOR gates 24 and 26, respectively. The output of the first NOR gate 24 is connected to both inputs of the gate 26 which provides the oscillator output. The oscillator output is connected through a feedback capacitor 28 to one input 30 of the first NOR gate 24 and a resistor 32 is connected between the output of the first gate 24 and its input 30. A second input 34 of the first NOR gate 24 is normally maintained at a low potential. Since the operation of such NOR gate oscillators is well known, the operation will not be described. It will be recognized, however, that so long as input 34 is at low potential, the oscillator will produce an alternating voltage at its output, but if a high potential is applied to input 34, the oscillation will cease.

The output of the oscillator 22 is connected through a coupling capacitor 36 and a series resistor 38 to the base of a transistor 40 which in turn is connected to the transistor 42 as a Darlington pair which serves as a transistor switch. The base of transistor 40 is connected to the probe 14. The emitter of the transistor 42 is grounded and its collector is connected through an indicator lamp 44 to the line B+. A third NOR gate 46 has both inputs connected to a point between the lamp 44 and the transistor switch and its output connected through a resistor 48 to the base of the transistor 40. A fourth NOR gate 50 has its inputs connected between the lamp 44 and the transistor switch and its output connected to the oscillator input 34.

In operation, the resistor 38 and the probe 14 form a voltage divider. When the liquid 10 is in contact with the probe, the impedance between the probe and ground is small so that the AC voltage from the oscillator 22 is primarily dissipated across the resistor 38 so that the resulting voltage is insufficient to turn on the transistor switch. Thus the collector of transistor 42 is at a high voltage assuring that the lamp 44 is turned off and the outputs of the NOR gates 46 and 50 are at a low level. When, however, the liquid level recedes to the point where it no longer contacts the probe 14, the impedance between the probe and ground will be large so that the AC signal applied to the base of transistor 40 is large. A positive pulse applied to the base of transistor 40 turns on the transistor switch so that the collector of transistor 42 approaches ground potential to illuminate the lamp 44. At the same time, the NOR gate 46 has a low potential applied to its inputs so that it produces a high potential at its output which is applied through resistor 48 to the base of transistor 40 thereby tending to hold on the transistor switch. The latching circuit provided by the gate 46 would be sufficient to positively hold on the transistor switch in spite of negative pulses from the oscillator provided that very close component tolerances were maintained during circuit manufacture. To avoid the expense and problems of holding such close tolerances, the second latching circuit comprising a NOR gate 50 is used to turn off the oscillator 22. Since the inputs of the NOR gate are at a low potential when the transistor switch conducts, the gate output applied to oscillator input 34 will be at a high potential to inhibit operation of the oscillator. Then there will be no negative pulses from the oscillator to overcome the positive bias from the NOR gate 46 so that the two latching circuits acting in concert will assure that the transistor switch will remain constantly conductive once it has been turned on. In the event the liquid level rises to contact the probe again, the base at transistor 40 will be effectively grounded to turn off the transistor switch and warning lamp and return the latching circuits and the oscillator to their normal states.

With this arrangement then, accuracy in component values is relatively unimportant, allowing the circuit to be manufactured inexpensively and the circuit may be designed with more attention being paid to switch point and gate dissipation values. An additional advantage of the circuit is its utilization of four NOR gates. A C-MOS gate package containing four dual input NOR gates is readily available and inexpensive thereby providing the heart of the oscillator and both latching circuits at low cost.

The embodiments of the invention in which an exclusive property or privilege is claimed are defined as follows:

1. A liquid level warning circuit for use in monitoring the level of liquid in a container, the liquid being in electrically conducting relation to one terminal of a power supply, the circuit comprising a warning device connected to the other terminal of the power supply, an oscillator connected to the power supply, the oscillator having an alternating voltage output terminal and having an inhibit terminal effective to prevent oscillation when energized with unidirectional voltage;

switch means connected between the warning device and said one terminal of the power supply to selectively energize the warning device, said switch means having a control terminal capacitively coupled to the oscillator output terminal, and effective to energize the warning device in response to said alternating voltage;

a probe in the container to contact the liquid at a predetermined level and electrically connected to said control terminal so that when the probe is in contact with the liquid, the switch is turned off, and when the probe is out of contact with the liquid, the switch is biased on by an alternating voltage from the oscillator to energize the warning device, first latch means responsive to the conduction state of the switch and connected to the control terminal to tend to bias the switch on once it has been turned on, and second latch means responsive to the conduction state of the switch and connected to the inhibit terminal of the oscillator to prevent oscillation when the switch has been turned on, whereby the two latch means in concert hold the switch on to continuously energize the warning device.

* * * * *